United States Patent
Kim et al.

(10) Patent No.: US 12,090,635 B2
(45) Date of Patent: Sep. 17, 2024

(54) FINGER MECHANISM AND ROBOT HAND COMPRISING SAME

(71) Applicant: KOREA INSTITUTE OF MACHINERY & MATERIALS, Daejeon (KR)

(72) Inventors: Uikyum Kim, Daejeon (KR); Hyunmin Do, Daejeon (KR); Taeyong Choi, Daejeon (KR); Chanhun Park, Daejeon (KR); Dongil Park, Daejeon (KR); Doo-Hyeong Kim, Sejong (KR); Hwisu Kim, Daejeon (KR); Jin-Ho Kyung, Daejeon (KR)

(73) Assignee: KOREA INSTITUTE OF MACHINERY & MATERIALS, Daejeon (KR)

( * ) Notice: Subject to any disclaimer, the term of this patent is extended or adjusted under 35 U.S.C. 154(b) by 628 days.

(21) Appl. No.: 17/312,147

(22) PCT Filed: Dec. 10, 2019

(86) PCT No.: PCT/KR2019/017390
§ 371 (c)(1),
(2) Date: Jun. 9, 2021

(87) PCT Pub. No.: WO2020/122557
PCT Pub. Date: Jun. 18, 2020

(65) Prior Publication Data
US 2022/0055229 A1    Feb. 24, 2022

(30) Foreign Application Priority Data
Dec. 10, 2018    (KR) .................. 10-2018-0158272

(51) Int. Cl.
*B25J 15/00*    (2006.01)
*B25J 15/02*    (2006.01)

(52) U.S. Cl.
CPC ......... *B25J 15/0009* (2013.01); *B25J 15/022* (2013.01)

(58) Field of Classification Search
CPC ...... B25J 15/0009; B25J 15/022; B25J 15/08; B25J 9/1075
(Continued)

(56) References Cited

U.S. PATENT DOCUMENTS

| 4,821,594 A | * | 4/1989 | Rosheim | ............ B25J 17/0266 901/28 |
| 5,108,140 A | * | 4/1992 | Bartholet | ............ B25J 15/0009 294/115 |

(Continued)

FOREIGN PATENT DOCUMENTS

| JP | 2018-167375 A | 11/2018 |
| KR | 10-2007-0094827 A | 9/2007 |

(Continued)

OTHER PUBLICATIONS

International Search Report issued Jul. 10, 2020 corresponding to International Application No. PCT/KR2019/017390.

*Primary Examiner* — Paul T Chin
(74) *Attorney, Agent, or Firm* — Hauptman Ham, LLP

(57) ABSTRACT

In a finger mechanism and a robot hand having the finger mechanism, the finger mechanism uses a link based mechanism, and performs three degrees of freedom including two degrees of freedom of MCP joint and one degree of freedom of PIP join, via a driving part disposed at a side. The driving part is not disposed at each knuckle of the finger mechanism and additional sensors may be easily equipped, and thus modularized robot hand may be performed using the finger mechanism.

10 Claims, 15 Drawing Sheets

(58) Field of Classification Search
USPC .......................................... 294/111, 213, 106
See application file for complete search history.

(56) References Cited

U.S. PATENT DOCUMENTS

| | | | |
|---|---|---|---|
| D852,859 S * | 7/2019 | Kawaguchi | .................. D15/199 |
| 10,618,182 B2 * | 4/2020 | Zheng | .................... B25J 15/022 |
| 11,325,264 B1 * | 5/2022 | You | ........................ B25J 9/1075 |
| 11,331,811 B1 * | 5/2022 | Lo | ........................ B25J 15/0213 |
| 2010/0147098 A1 * | 6/2010 | Park | ........................ B25J 9/104 |
| | | | 901/29 |
| 2021/0229295 A1 * | 7/2021 | Campagna | ........... B25J 15/0009 |
| 2023/0133561 A1 * | 5/2023 | Kfoury | ................ B25J 15/0213 |
| | | | 294/106 |

FOREIGN PATENT DOCUMENTS

| | | |
|---|---|---|
| KR | 10-2012-0025255 A | 3/2012 |
| KR | 10-2013-0110973 A | 10/2013 |
| KR | 10-2016-0109376 A | 9/2016 |

* cited by examiner

FINGER MECHANISM AND ROBOT HAND COMPRISING SAME

CROSS-REFERENCE TO RELATED APPLICATION

This present application is a national stage filing under 35 U.S.C § 371 of PCT application number PCT/KR2019/017390 filed on Dec. 10, 2019, which is based upon and claims the benefit of priority to Korean Patent Application No. 10-2018-0158272 filed Dec. 10, 2018 in the Korean Intellectual Property Office. The disclosures of the above-listed applications are hereby incorporated by reference herein in their entireties.

BACKGROUND

1. Field of Disclosure

The present disclosure of invention relates to a finger mechanism and a robot hand having the finger mechanism, and more specifically the present disclosure of inventions relates to a finger mechanism having three degrees of freedom and a robot hand having the finger mechanism capable of being modularized.

2. Description of Related Technology

Recently, a humanoid robot has been developed to be able to act like human beings, and a robot hand capable of operating precise and accurate motion like a hand of human beings should be developed to increases perfection of the humanoid robot.

The conventional representative robot hand may be operated based on a tendon based mechanism in which a wire is used for the robot hand and a link based mechanism in which the wire is not used.

In the tendon based mechanism, like the hand of human beings, each finger has three degrees of freedom and thus, the precise and accurate motion may be performed. However, to have three degrees of freedom, a lot of tendons should be used and the tendons are hard to be assembled, so that the manufacturing and the maintenance may be difficult. In addition, a lot of motors for operating the tendons are also necessary, and thus even though the size of the finger may be very similar to the hand of human beings, the motors disposed or arranged at a wrist occupies relatively larger volume and thus the modularization may be impossible.

In contrast, in the link based mechanism, the motors for operating the tendons are less used and thus demerits of the tendon based mechanism may be solved and the modularization may be possible. However, until now, in the link based mechanism, two degrees of freedom is maximum for each finger and the precise and accurate motion is hard to be performed. In addition, the motor is disposed at each knuckle, and thus additional sensors like a touch sensor, a force sensor and so on may be hard to be additionally equipped.

Related prior art is Korean laid-open patent No. 10-2013-0110973.

SUMMARY

The present invention is developed to solve the above-mentioned problems of the related arts. The present invention provides a finger mechanism and a robot hand having the finger mechanism, configured as a link based mechanism.

In addition, the present invention provides a finger mechanism and a robot hand having the finger mechanism, having increased degrees of freedom.

In addition, the present invention provides a finger mechanism and a robot hand having the finger mechanism, capable of being modularized.

In addition, the present invention provides a finger mechanism and a robot hand having the finger mechanism, capable of integrating sensors.

In addition, the present invention provides a finger mechanism and a robot hand having the finger mechanism, having a size similar to that of a hand of human beings.

In addition, the present invention provides a finger mechanism and a robot hand having the finger mechanism, capable of being manufactured with a relatively less cost price.

According to an example embodiment, the finger mechanism includes a base 10 extending along a Z axis direction, a first knuckle 20, a first driving part 30 configured to control a movement of the first knuckle with respect to the base, and a first joint 40 including a frame.

Here, the first driving part may include a first actuator and a second actuator. The first point may be rotatably connected to the base, a second point may be connected to the first actuator, a third point may be connected to a second actuator in the frame, so that the frame may be rotated with respect to the first point as the first driving part is driven.

Here, a first end of the first knuckle may be connected to the frame, so that the first knuckle may be rotated around an X axis with respect to the base when the first actuator and the second actuator move the second point and the third point equally, and the first knuckle may be rotated around an Y axis with respect to the base when the first actuator and the second actuator move the second point and the third point unequally.

In an example, each of the first actuator and the second actuator may be a linear actuator driven along the Z axis direction In an example, the first joint may further include a first link bar connecting the second point with a moving slide of the first actuator, and a second link bar connecting the third point with a moving slide of the second actuator. The first link bar may be rotatably connected with each of the second point and the moving slide of the first actuator, and the second link bar may be rotatably connected with each of the third point and the moving slide of the second actuator.

In an example, the first point and the base may be connected with each other via a universal joint. A rod end bearing may be configured to connect the first link bar with the second point, to connect the first link bar with the moving slide of the first actuator, to connect the second link bar with the third point, and to connect the second link bar with the moving slide of the second actuator.

In an example, the first point, the second point and the third point may form an imaginary isosceles triangle, and a line between the second point and the third point may form a base of the imaginary isosceles triangle.

In an example, the finger mechanism may further include a second knuckle 50, a second driving part 60 configured to control a movement of the second knuckle with respect to the first knuckle, and a second joint 70 including a bell crank.

In an example, a fourth point which is a second end of the first knuckle may be rotatably connected with a sixth point which is a first end of the second knuckle.

In an example, a center of the bell crank may be rotatably connected with the frame, a first end of the bell crank may be connected to the second driving part, a second end of the bell crank may be connected to a seventh point which is a first end of the second knuckle and is spaced apart from the sixth point along a rotated direction of the second knuckle.

In an example, each of the first driving part and the second driving part may be disposed at a first side of the Z axis direction with respect to the first joint, and each of the first knuckle and the second knuckle may be disposed at a second side of the Z axis direction with respect to the first joint.

In an example, the bell crank may be disposed at the same side with the first knuckle with respect to the frame. The second joint may include a third link bar passing through the frame to connect the second driving part with the first end of the bell crank, and a fourth link bar connecting the second end of the bell crank with the seventh point.

In an example, the finger mechanism may further include a third knuckle 80, and a third joint 90 configured to control the third knuckle to be interlocked with a movement of the second knuckle with respect to the first knuckle.

In an example, an eighth point which is a first end of the third knuckle may be connected to a second end of the second knuckle. The third joint may include a fifth link bar having a first end connected to a fifth point which is a second end of the first knuckle and a second end connected to a ninth point which is a second end of the third knuckle. The fifth point may be spaced from the fourth point along an opposite direction of a rotational direction of the second knuckle, and the ninth point may be spaced apart from the eighth point along the rotational direction of the second knuckle.

According to another example embodiment, a robot hand includes at least one finger mechanism, and each of the finger mechanism is the finger mechanism mentioned above.

In an example, the base of at least one finger mechanism may form a single palm.

In an example, at least one driving part configured to drive at least one finger mechanism may be disposed inside of the palm.

According to the present example embodiments, the finger mechanism and the robot hand having the finger mechanism are configured to have relatively high degree of freedom, based on the link base mechanism.

In addition, the finger mechanism and the robot hand having the finger mechanism have relatively simple structure and have the size similar to that of the hand of human beings, and thus the cost price for manufacturing may be decreased.

In addition, in the finger mechanism and the robot hand, the driving part is disposed inside of a palm instead of being disposed at each knuckle of the finger, and thus additional sensors may be easily equipped and the sensors may be easily integrated. Thus, the finger mechanism and the robot hand may be easily modularized.

Figure 1:
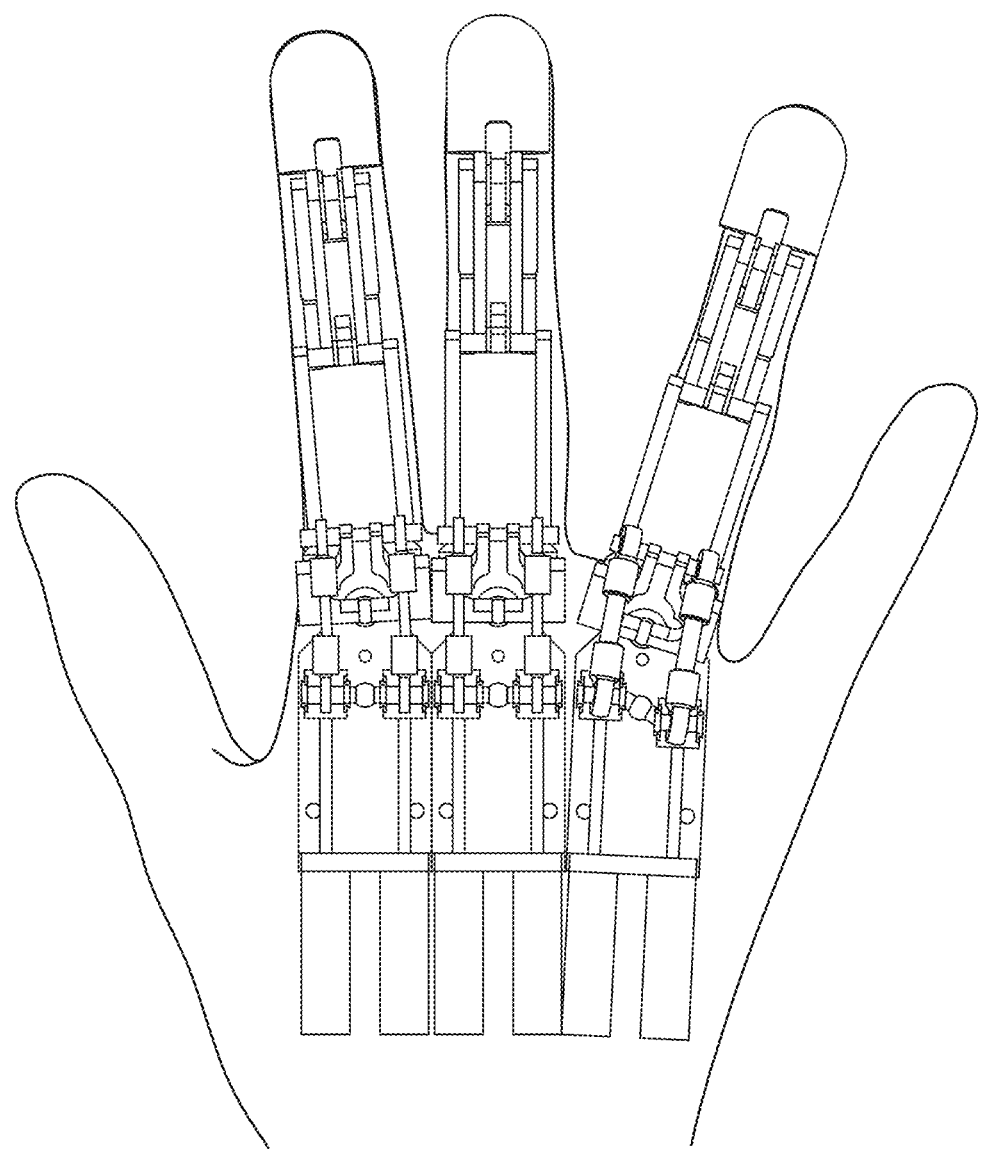
FIG. 1 is an image showing a robot hand according to an example embodiment of the present invention.

| * Reverence numerals | |
|---|---|
| 10: base | 20: first knuckle |
| 30: first driving part | 40: first joint |
| 50: second knuckle | 60: second driving part |
| 70: second joint | 80: third knuckle |
| 90: third joint | 100, 200, 300: finger mechanism |

DETAILED DESCRIPTION

The invention is described more fully hereinafter with Reference to the accompanying drawings, in which embodiments of the invention are shown.

Hereinafter, the elements, the driving, the mechanism and so on for explaining a finger mechanism and a robot hand having the finger mechanism are selectively explained, and other explanation omitted below may be fully understood based on the scope of the invention to those skilled in the art.

This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawings, the size and relative sizes of layers and regions may be exaggerated for clarity.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless otherwise defined, all terms (including technical and scientific terms) used herein have the same meaning as commonly understood by one of ordinary skill in the art to which this invention belongs.

Figure 2:
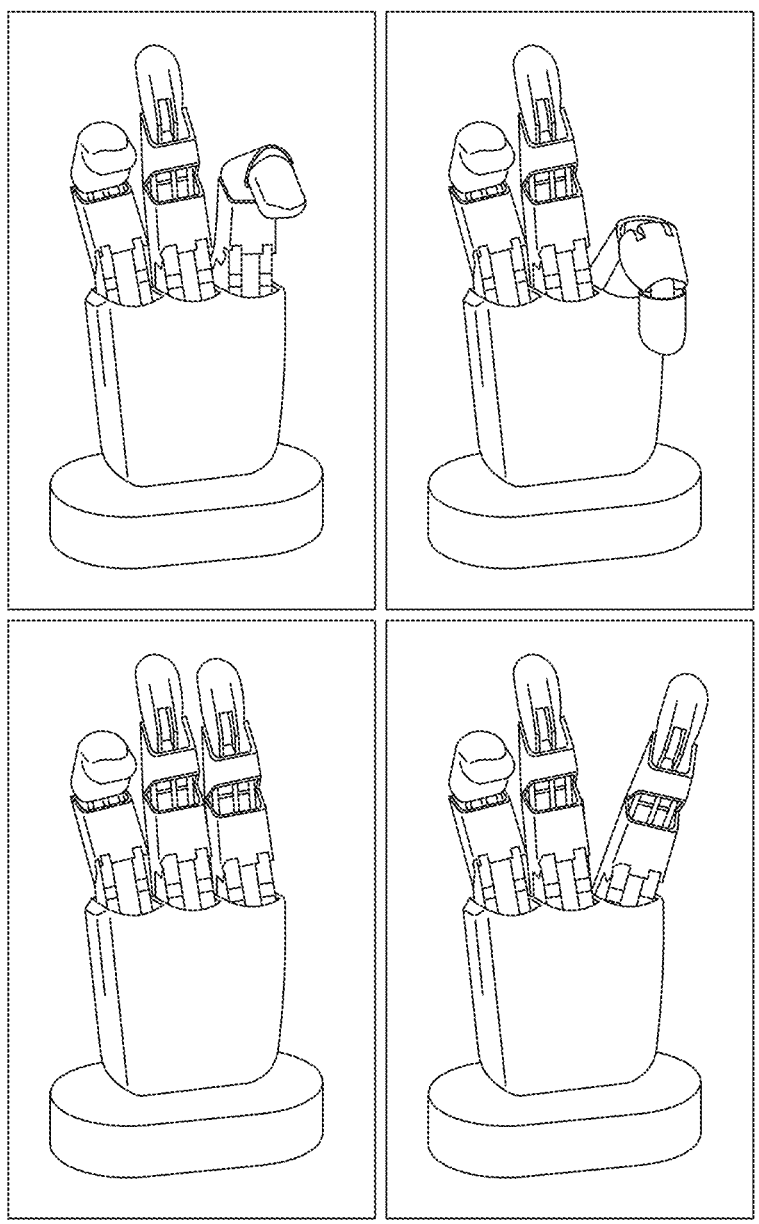
FIG. 2 is images showing motions of fingers of the robot hand of FIG. 1, with having three degrees of freedom like a finger of human beings.

FIG. 1 is an image showing a robot hand according to an example embodiment of the present invention. FIG. 2 is images showing motions of fingers of the robot hand of FIG. 1, with having three degrees of freedom like a finger of human beings.

As illustrated in FIG. 1, the robot hand according to the present example embodiment is manufactured to have a size substantially same as that of a hand of human beings, and is not performed as a tendon based mechanism in which a wire is necessary, so that the manufacturing and the maintenance may be more simplified.

In addition, as illustrated in FIG. 1, in the robot hand, a driving part for driving each finger is disposed inside of a palm of the robot hand, and thus the robot hand may be easily modularized.

In addition, as illustrated in FIG. 1, the robot hand is operated based on a link based mechanism and a motor is unnecessary to be disposed at each knuckle of the finger, so that additional sensors like a touch sensor, a force sensor and so on may be easily added and three degrees of freedom may be performed like the finger of the human beings, as illustrated in FIG. 2. Thus, the robot hand may be precisely and accurately operated.

Further, in FIG. 1 and FIG. 2, only three fingers are illustrated in a single palm, but the number of the fingers connected from the single palm is not limited thereto, and thus five fingers may be also connected from the single palm.

Hereinafter, a finger mechanism 100 of the robot hand according to the present example embodiment is explained in detail.

Figure 3:
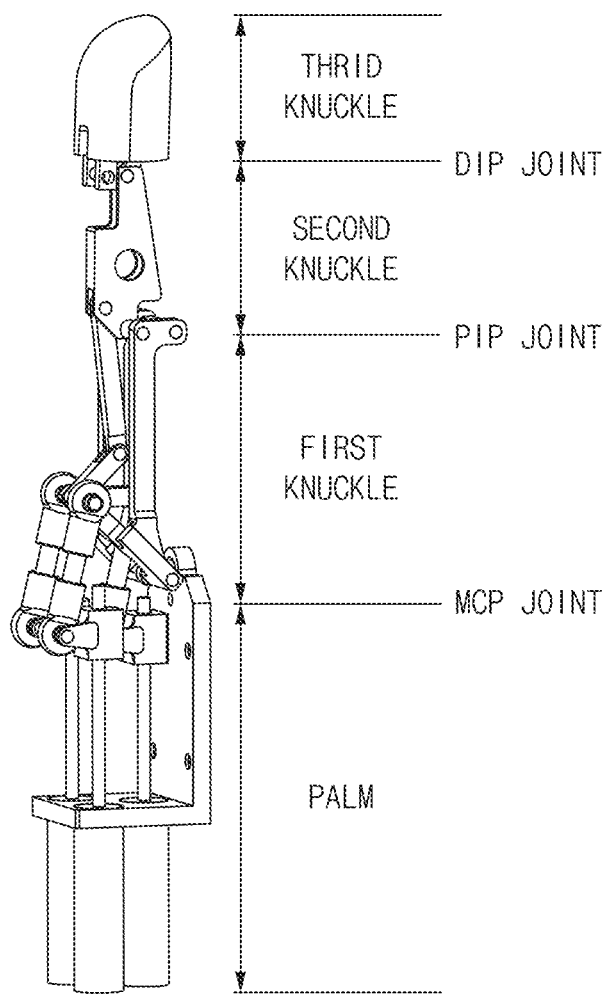
FIG. 3 is an image showing a finger mechanism of the robot hand of FIG. 1.

FIG. 3 is an image showing a finger mechanism of the robot hand of FIG. 1.

Referring to FIG. 3, the finger mechanism 100 includes three knuckles (first, second and third knuckles), three joints (first, second and third joints), and a driving part for driving the joints.

The first joint may correspond to a MCP (metacarpophalangeal) joint which is a joint between the palm and the finger. The second joint may correspond to a PIP (proximal interphalangeal) joint which is a joint between the first knuckle and the second knuckle. The third joint may correspond to a DIP (distal interphalangeal) joint which is a joint between the second knuckle and the third knuckle.

Hereinafter, referring to FIGS. 4 to 8B, the finger mechanism 100 having two degrees of freedom of the MCP joint is explained in detail. Here, in the finger mechanism 100, the finger is bent and unfolded, or moves from side to side.

Figure 4:
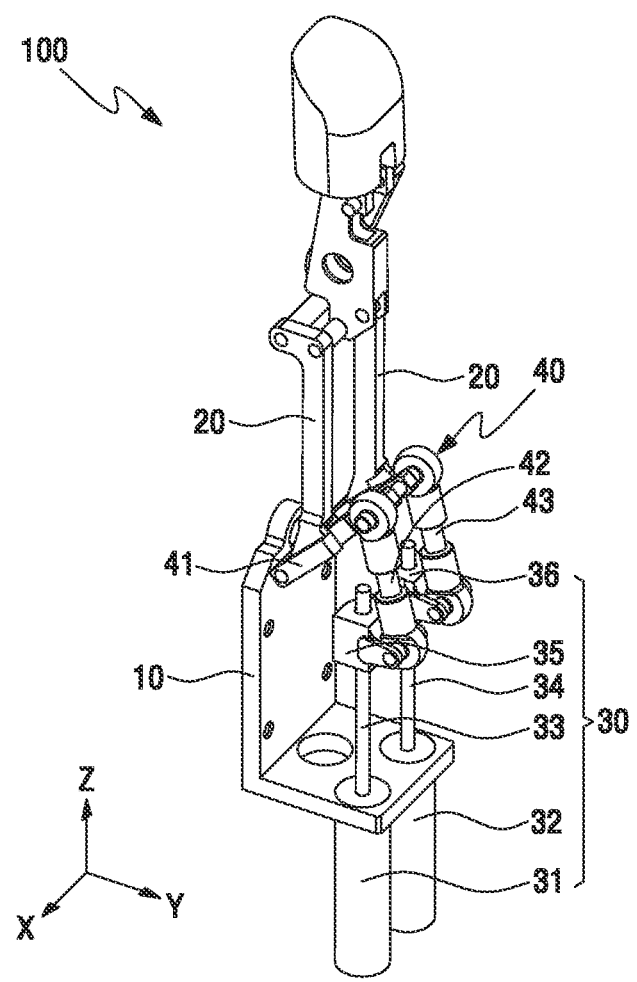
FIG. 4 is a perspective view illustrating the finger mechanism of FIG. 3.
Figure 5:
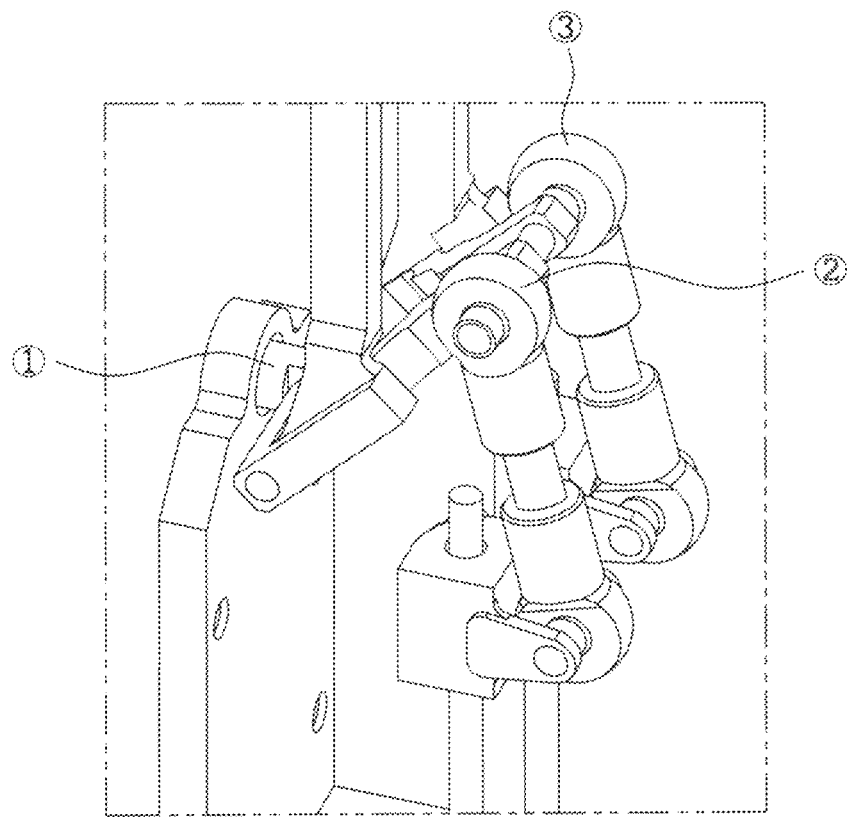
FIG. 5 is an exploded perspective view illustrating a combination between a first joint with other elements in the finger mechanism of FIG. 4.
Figure 6:
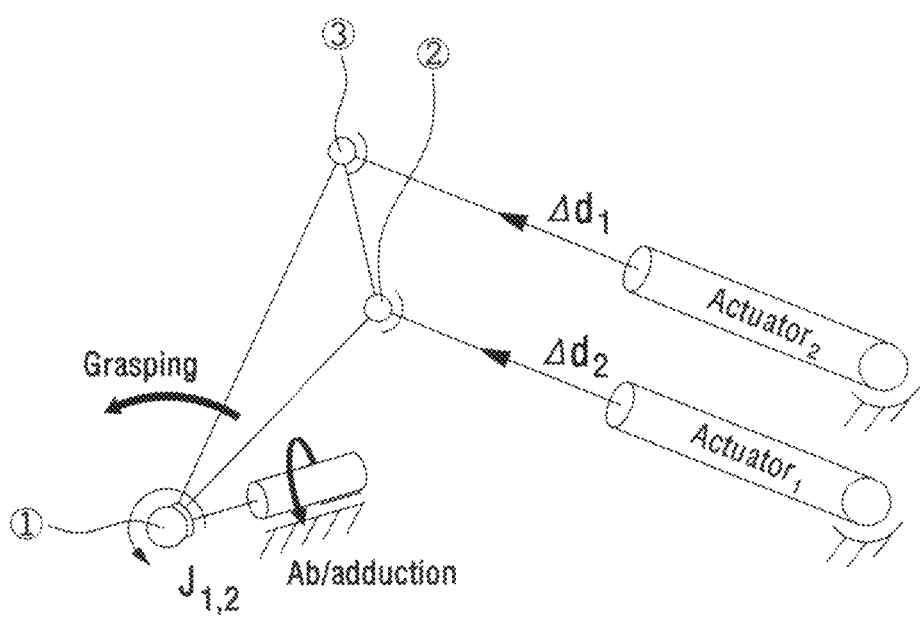
FIG. 6 is a conceptual view illustrating a mechanism for performing two degrees of freedom in the finger mechanism of FIG. 4.
Figure 7:
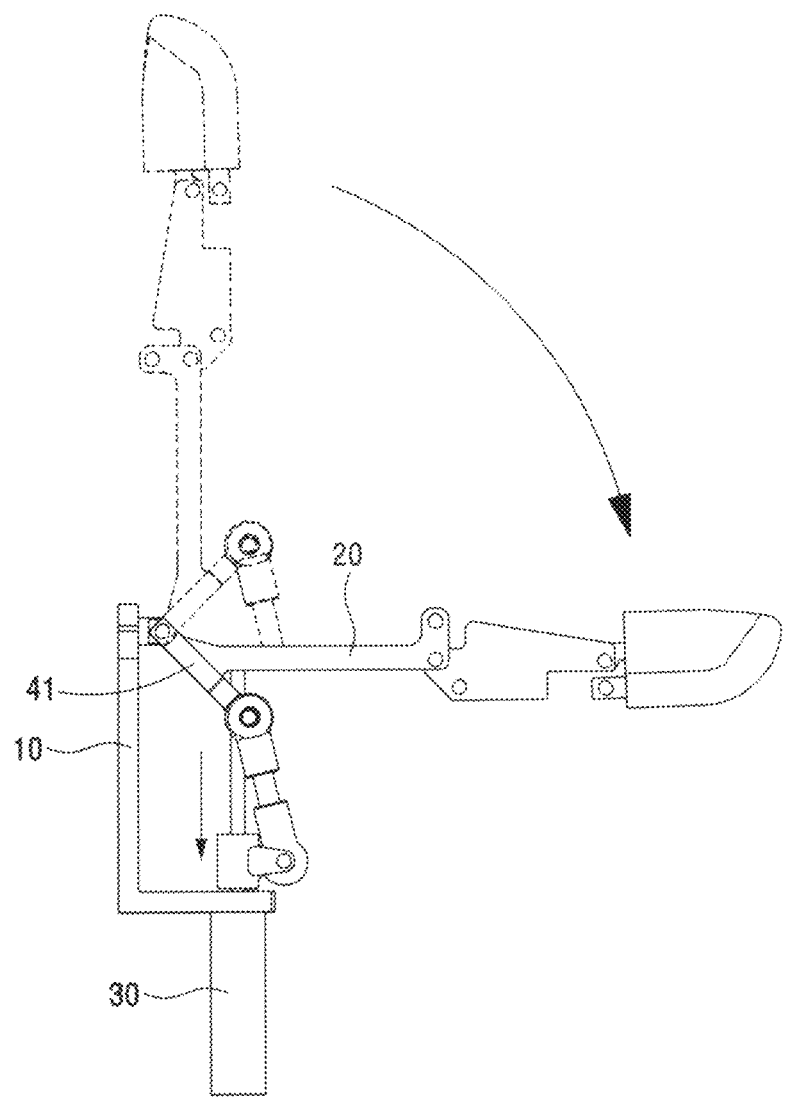
FIG. 7 is a side view illustrating a motion of the finger mechanism of FIG. 4, when a first actuator and a second actuator are driven equally.
Figure 8A:
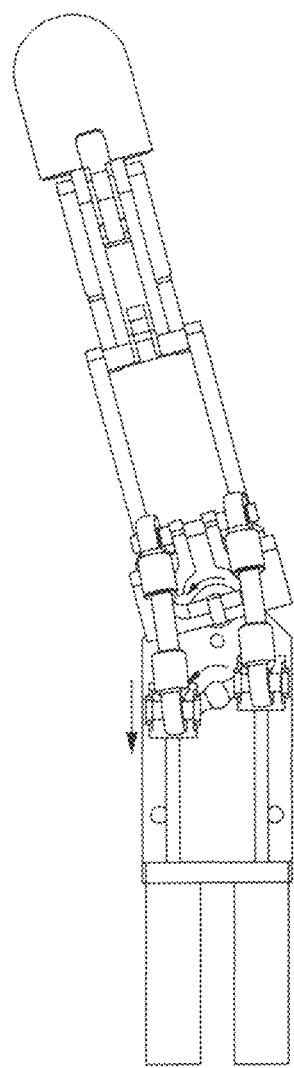
FIG. 8A and FIG. 8B are front views illustrating motions of the finger mechanism of FIG. 4, when the first actuator and the second actuator are driven differently.
Figure 8B:
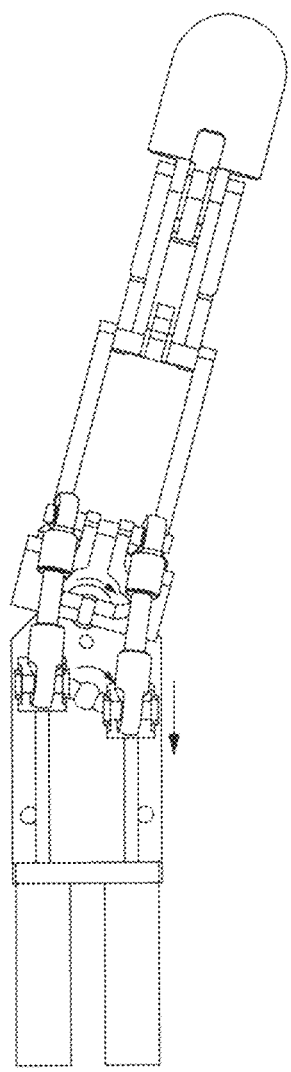

FIG. 4 is a perspective view illustrating the finger mechanism of FIG. 3. FIG. 5 is an exploded perspective view illustrating a combination between a first joint with other elements in the finger mechanism of FIG. 4. FIG. 6 is a conceptual view illustrating a mechanism for performing two degrees of freedom in the finger mechanism of FIG. 4. FIG. 7 is a side view illustrating a motion of the finger mechanism of FIG. 4, when a first actuator and a second actuator are driven equally. FIG. 8A and FIG. 8B are front views illustrating motions of the finger mechanism of FIG. 4, when the first actuator and the second actuator are driven differently.

As illustrated in FIG. 4, the finger mechanism 100 includes a base 10, a first knuckle 20, a first driving part 30 configured to control a movement of the first knuckle 20 with respect to the base 10, and a first joint 40.

The base 10 corresponds to a palm or a back of hand in the robot hand, and the finger mechanism 100 moves with respect to the base 10. For the convenience of the explanation, in the present example embodiment, the base 10 extends along a Z axis direction (a third direction, but not limited thereto, and thus the base 10 may extend along an X axis direction (a first direction) or an Y axis direction (a second direction). Here, the first direction is perpendicular to the second direction, and the first and the second directions are perpendicular to the third direction, as illustrated in FIG. 4.

The first knuckle 20 corresponds to a finger in the robot hand. The first knuckle 20 rotates around the X axis with respect to the base 10, by the first joint 40 and the first driving part 30, which is defined as a first degree of freedom and by which the finger is folded and unfolded. In addition, the first knuckle 20 rotates around the Y axis with respect to the base 10, by the first joint 40 and the first driving part 30, which is defined as a second degree of freedom and by which the finger moves sideways.

The first driving part 30 drives the movement of the first knuckle 20 with two degrees of freedom, and includes first and second actuators arranged in parallel with each other.

As illustrated in FIG. 4, each of the first and second actuators may be a linear actuator. Here, the first and second actuators respectively include motors 31 and 32, ball screws 33 and 34 rotated by the motors, moving slides 35 and 36 combined with the ball screws 33 and 34 to move up and down by the rotation of the ball screw. Thus, the first knuckle 20 may rotate around the X axis or around the Y axis, by the combination of the movements of the first and second actuators.

The first joint 40 is rotatably connected with the base 10, and moves due to the first driving part 30.

For example, the first joint 40 may include a frame 41 as illustrated in FIG. 4 and FIG. 5.

As illustrated in FIG. 5, a first point ① of the frame 41 is rotatably connected with the base 10, a second point ② is connected to the first actuator, and a third point ③ is connected to the second actuator. Here, to perform the movement of the first knuckle 20 with two degrees of freedom, the frame 41 moves all directions with respect to the base 10, and thus a universal joint may be used to connect the first point ① with the base 10.

However, a small amount of rotations is sufficient at the second point and the third point to perform the movement of the first knuckle with two degrees of freedom, but the second and third points are very important to support a load applied to the finger. Thus, a rod end bearing is used to connect the second point with the first actuator, and to connect the third point with the second actuator.

Accordingly, the frame 41 of the first joint connected to the base 10 and the first driving part 30, rotates around the X axis with respect to the base 10 (Grasping), when the first and second actuators move the frame 41 equally ($\Delta d_1 = \Delta d_2$) as illustrated in FIG. 6. In contrast, the frame 41 of the first joint rotates around the Y axis with respect to the base 10 (Ab/adduction), when the first and second actuators move the frame 41 unequally ($\Delta d_1 \neq \Delta d_2$) as illustrated in FIG. 6.

In addition, as illustrated in FIG. 4, in the finger mechanism 100, a first end of the first knuckle 20 is connected to the frame 41. For example, the first knuckle 20 is connected to an upper portion of the frame 41 along the Z axis direction. Thus, when the first and second actuators move the frame 41 equally ($\Delta d_1 = \Delta d_2$), the first knuckle 20 corresponding to the finger, as illustrated in FIG. 7, rotates around the X axis with respect to the base 10 corresponding to the palm or the back of hand, which means the movement of the first degree of freedom in which the finger is folded and unfolded. In contrast, when the first and second actuators move the frame 41 unequally ($\Delta d_1 \neq \Delta d_2$), the first knuckle 20, as illustrated in FIG. 8A and FIG. 8B, rotates around the Y axis with respect to the base 10, which means the movement of the second degree of freedom in which the finger moves sideways.

Here, for the equivalent movement, the first point ①, the second point ② and the third point ③ may form an imaginary isosceles triangle, and a line between the second point and the third point may form a base of the imaginary isosceles triangle.

Considering the movement of the fingers of human beings, when the palm is entirely unfolded, the fingers and the palm are disposed in the same plane. However, when the palm is entirely folded, the finger are disposed substantially perpendicular to the palm.

Thus, to perform the above mentioned movement, the frame 41 of the finger mechanism 100 should be rotated around the X axis by about 90°.

In addition, the linear actuator of the first driving part 30 should move along the Z axis direction which is the same direction with the extending direction of the base 10, so as to be disposed inside of the palm of the robot hand.

Thus, the frame 41 of the finger mechanism 100, as illustrated in FIG. 4, is disposed to be 45° with respect to the base 10, when the first knuckle 20 stands aligned with the base 10 along the Z axis direction. Here, the base 10 may rotate within a range between about 45° and about 135°.

In addition, a first link bar 42 connects the second point ② of the frame 41 with the moving slide 35 of the first actuator, and a second link bar 43 connects the third point ③ of the frame 41 with the moving slide 36 of the second actuator.

Initially, the frame 41 is positioned to be 45° with respect to the base 10, and the second link bar is used to connect the frame 41 with the actuator, so that the driving part may be a linear actuator along the Z axis direction and may be disposed in the palm of the robot hand. However, as illustrated in FIG. 7, the first knuckle 20 may rotate around the X axis by 90° from the standing direction along the Z axis direction to a horizontal direction along the Y axis direction.

In addition, as illustrated in FIG. 4 and FIG. 5, the rod end bearing is used to connect the first link bar 42 with the second point ② of the frame 41, to connect the first link bar 42 with the moving slide 35 of the first actuator, to connect the second link bar 43 with the third point ③ of the frame 41, and to connect the second link bar 43 with the moving slide 36 of the second actuator. Then, the first and second actuators are driven unequally, and the first knuckle 20 rotates around the Y axis. Here, the actuator extending along the Z axis should be connected with the frame 41 rotated around the Y axis.

As explained above, in the finger mechanism 100 according to the present example embodiment, two degrees of freedom of the MCP joint is performed based on the link base mechanism, and the first driving part includes two actuators arranged in parallel with each other. Then, the combination of the movements of two actuators performs two degrees of freedom motion of the MCP joint and thus more than twice of load may be supported compared to the conventional link mechanism.

Figure 9:
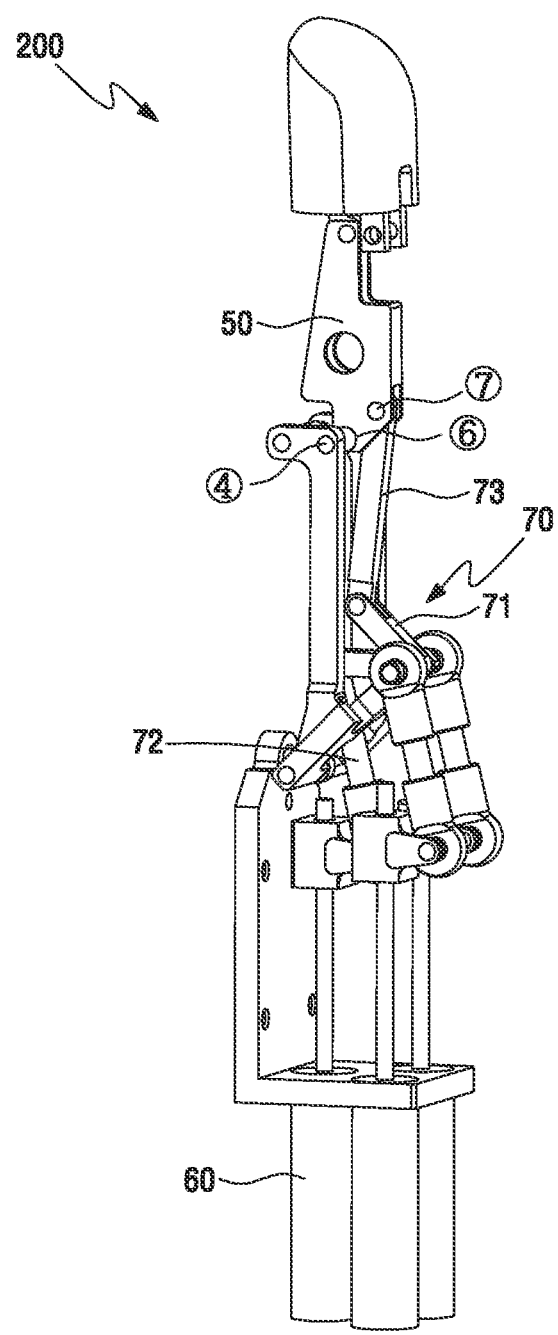
FIG. 9 is a perspective view illustrating a finger mechanism according to another example embodiment of the present invention.
Figure 10:
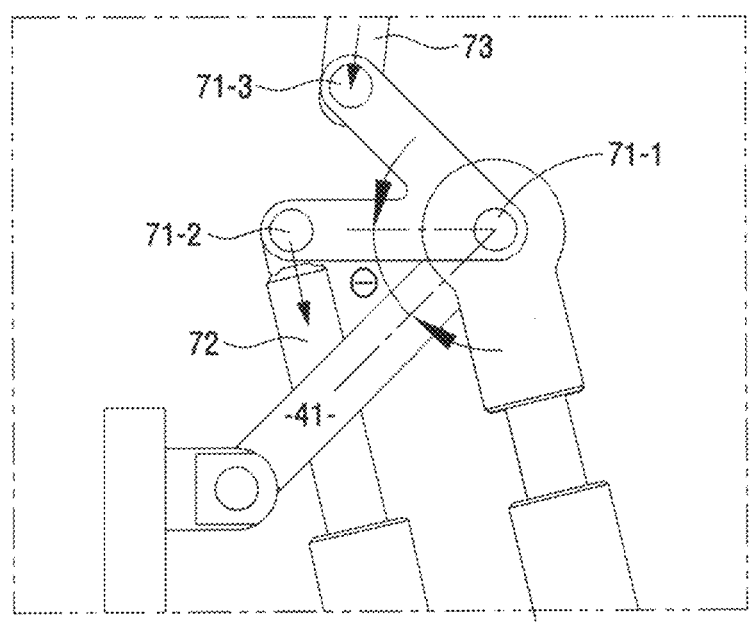
FIG. 10 is an exploded perspective view illustrating a combination between a second joint with other elements in the finger mechanism of FIG. 9.
Figure 11:
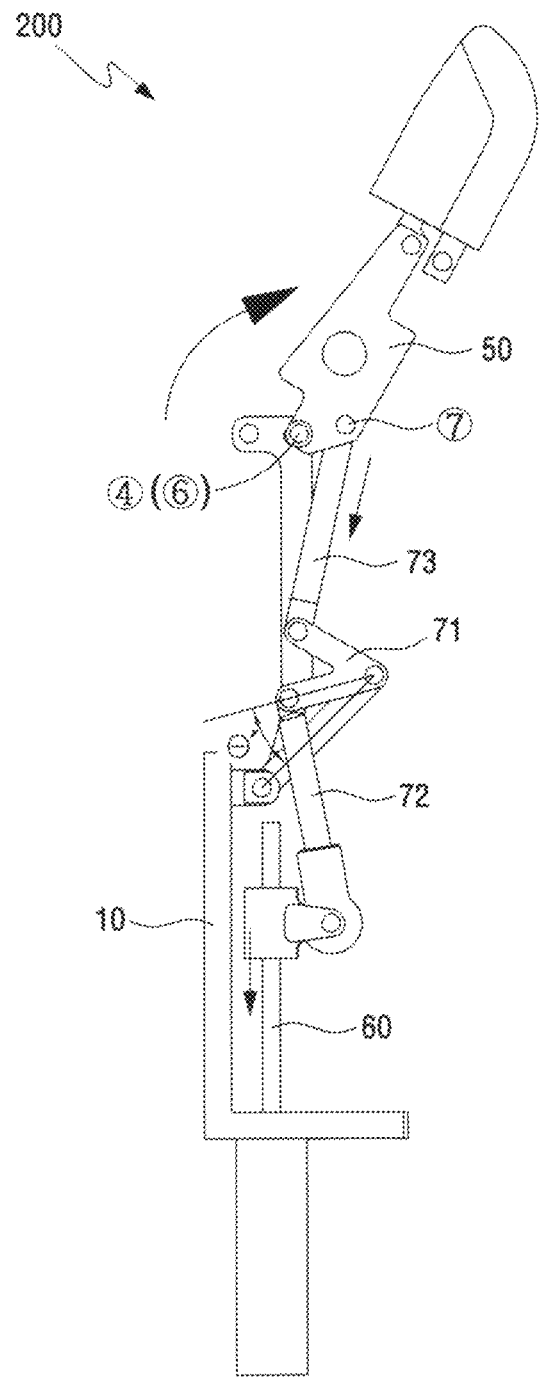
FIG. 11 is a side view illustrating a motion of the finger mechanism of FIG. 9, when a second driving part is operated.

Then, referring to FIGS. 9 to 11, a finger mechanism 200 according to another example embodiment of the present invention is explained in detail.

FIG. 9 is a perspective view illustrating a finger mechanism according to another example embodiment of the present invention. FIG. 10 is an exploded perspective view illustrating a combination between a second joint with other elements in the finger mechanism of FIG. 9. FIG. 11 is a side view illustrating a motion of the finger mechanism of FIG. 9, when a second driving part is operated.

The finger mechanism 200 according to the present example embodiment performs the movement of the PIP joint in addition to the movement of the MCP joint which is performed by the finger mechanism 100 according to the previous example embodiment. Here, the PIP joint is independent of the MCP joint.

Referring to FIGS. 9 to 11, the finger mechanism 200 according to the present example embodiment further includes a second knuckle 50, a second driving part 60 configured to control a movement of the second knuckle 50 with respect to the first knuckle 20, in addition to the elements included in the finger mechanism 100.

A first end of the second knuckle 50 is connected to a second end of the first knuckle 20, so that the second knuckle 50 extends from the first knuckle 20. Here, the first knuckle 20 may be a first knuckle of the finger extending from the palm, and the second knuckle 50 may be a second knuckle of the finger extending from the first knuckle of the finger.

As the first knuckle of the finger is connected to the second knuckle of the finger by the PIP joint and the second knuckle of the finger is able to be rotated (bent) with respect to the first knuckle of the finger, in the finger mechanism according to the present example embodiment, the second knuckle 50 is rotatably connected with the first knuckle 10. For example, as illustrated in FIG. 9, a fourth point ④ which is a second end of the first knuckle 20 is connected to a sixth point ⑥ which is a first end of the second knuckle 50 by a pin, and then the second knuckle 50 is rotated with respect to the first knuckle 20 at the pin.

The second driving part 60 drives the second knuckle 50 to be rotated with respect to the first knuckle 20. As illustrated in FIG. 9, the second driving part 60 may be a single linear actuator which includes a motor, a ball screw rotated by the motor, and a moving slide combined with the ball screw and moving up and down along the rotational movement of the ball screw. Thus, the single linear actuator moves along the Z axis direction.

In addition, the second driving part 60 is located at substantially same position as the first driving part 30 along the Z axis direction. For example, as illustrated in FIG. 9, the second driving part 60 is positioned closer to the base 10 compared to the first driving part 30, and thus two actuators of the first driving part and the single actuator of the second driving part may form a triangle.

In addition, the first driving part 30 and the second driving part 60 are disposed at a first side along the Z axis direction with respect to the frame 41 of the first joint 40, and the first knuckle 20 and the second knuckle 50 are disposed at a second side along the Z axis direction with respect to the frame 41.

In the conventional robot hand having the link base mechanism, the motors are disposed at each knuckle of the finger to supply the power to the joint. In contrast, in the finger mechanism 200 according to the present example embodiment, the first and second driving parts 30 and 60 are disposed under the first joint 40 along the Z axis direction, in other words, disposed in the palm. Thus, when the additional sensors like the touch sensor, the force sensor and so on are added to the end of the robot hand, signal lines may be easily connected to the sensors through an inside of the finger of the robot hand.

Then, as illustrated in FIG. 9, the second joint 70 includes a bell crank 71.

The bell crank is a lever having a bent shape like an 'L' shape, and changes a direction and a magnitude of a force applied from a first end to transfer the changed force to a second end. In the finger mechanism 200 according to the present example, the bell crank 71 transfers the driving force of the second driving part to the second knuckle 50, to rotate the second knuckle 50 with respect to the first knuckle 20. To perform the above mentioned movement, a center 71-1 of the bell crank 71 is rotatably connected to the frame 41, a first end 71-2 of the bell crank 71 is connected to the second driving part 60, and a second end 71-3 of the bell crank 71 is connected to the second knuckle 50.

For example, the bell crank 71 is disposed at an upper side of the frame 41 along the Z axis direction and the second driving part 60 is disposed at a lower side of the frame 41 along the Z axis direction, so that the first end 71-2 of the bell crank 71 may be stably connected to the second driving part 60 via a third link bar 72 passing through the frame 41. In addition, the second knuckle 50 is connected to the second end of the first knuckle 20, so that the second end 71-3 of the bell crank 71 may be connected to the second knuckle 50 via a fourth link bar 73. Here, the fourth link bar 73 is connected to a seventh point ⑦ of the second knuckle 50, and the seventh point ⑦ is spaced apart from the sixth point ⑥ along a rotational direction of the second knuckle 50.

The movement of the second knuckle 50 due to the second driving part and the second joint is explained below.

Referring to FIG. 10, when the second driving part 60 is not driven, the bell crank 71 forms an angle θ with the frame 41. Here, as the second driving part 60 is driven to pull the third link bar 72, the bell crank 71 rotates with respect to the center 71-1 and the fourth link bar 73 connected to the second end 71-3 is pulled downwardly.

Due to the above movement, as illustrated in FIG. 11, the angle between the bell crank 71 and the frame 41 decreases by an angle θ' (<θ). In addition, the sixth point ⑥ of the second knuckle 50 connected to the second end of the first knuckle 20 is fixed, and the seventh point ⑦ to which the fourth link bar 73 is connected is only pulled downwardly, so that the second knuckle 50 rotates with respect to the first knuckle 20.

In addition, even though the first driving part 30 is driven to rotate the first knuckle 20 around the X axis (the first knuckle is bent), the second driving part 60 is driven to maintain the angle between the bell crank 71 and the frame 41, so that the second knuckle 50 rotates with the first knuckle 20 at the same time without being rotated with respect to the first knuckle 20. That is, even though the first driving part 30 is driven to rotate the first knuckle 20 as illustrated in FIG. 7, when the angle θ between the bell crank 71 and the frame 41 is maintained not to be changed, the second knuckle 50 is not rotated with respect to the first knuckle 20 and the second knuckle 50 and the first knuckle 20 performs the bending movement of the finger with the second knuckle 50 and the first knuckle 20 extending along a line.

As explained above, in the finger mechanism 200 according to the present example embodiment, two degrees of freedom of the MCP joint and one degree of freedom of the PIP joint are added to perform three degrees of freedom. In addition, the link base mechanism is applied, and the power from the second driving part disposed under the first joint is supplied to the second joint disposed over the first joint via the bell crank, so that the problem of the conventional robot hand having the link base mechanism in which the motor driving each knuckle of the finger should be equipped at each knuckle may be solved.

Hereinafter, a finger mechanism 300 according to still another example embodiment of the present invention is explained referring to FIGS. 12 to 14.

Figure 12:
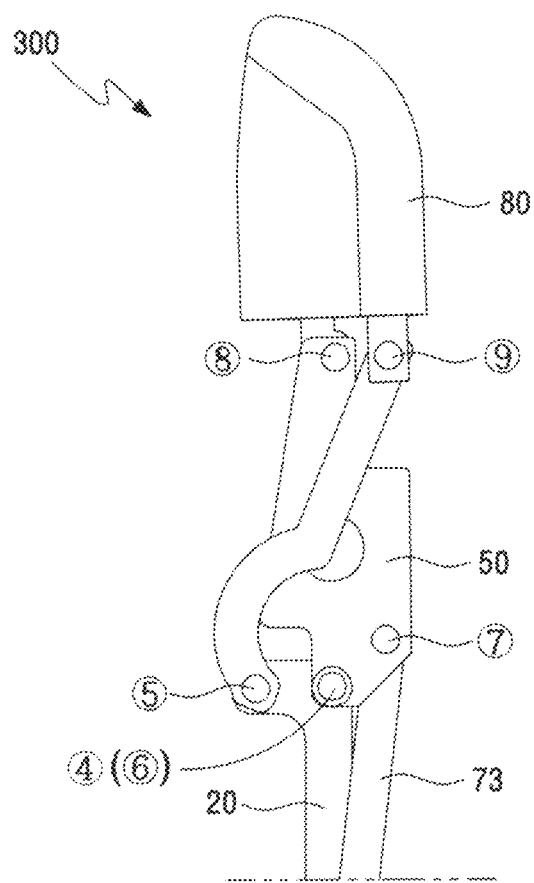
FIG. 12 is a side view partially illustrating a finger mechanism according to still another example embodiment of the present invention.

FIG. 12 is a side view partially illustrating a finger mechanism according to still another example embodiment of the present invention. FIG. 13 is a side view illustrating a motion of a third knuckle rotated in conjunction with a rotation of a second knuckle in the finger mechanism of FIG. 12. FIG. 14 is a side view illustrating a motion of the finger mechanism of FIG. 12.

Figure 13:
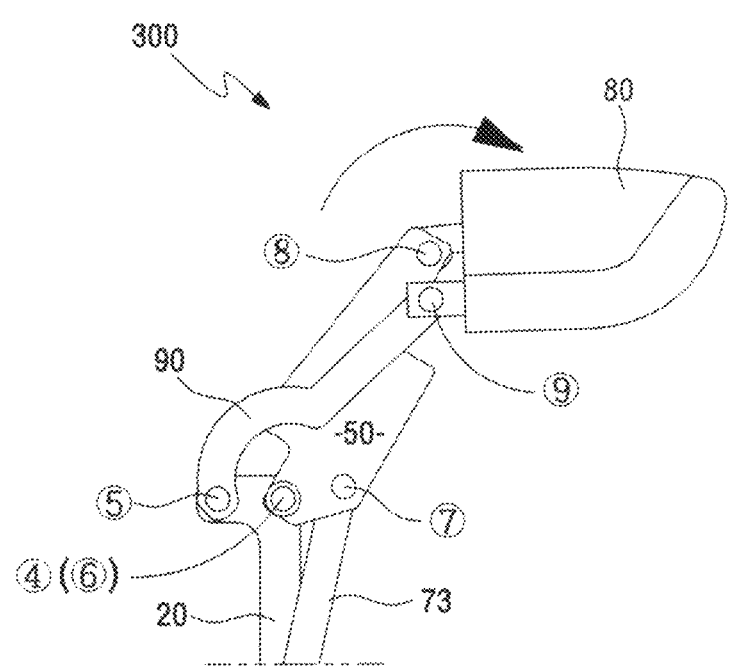
FIG. 13 is a side view illustrating a motion of a third knuckle rotated in conjunction with a rotation of a second knuckle in the finger mechanism of FIG. 12.
Figure 14:
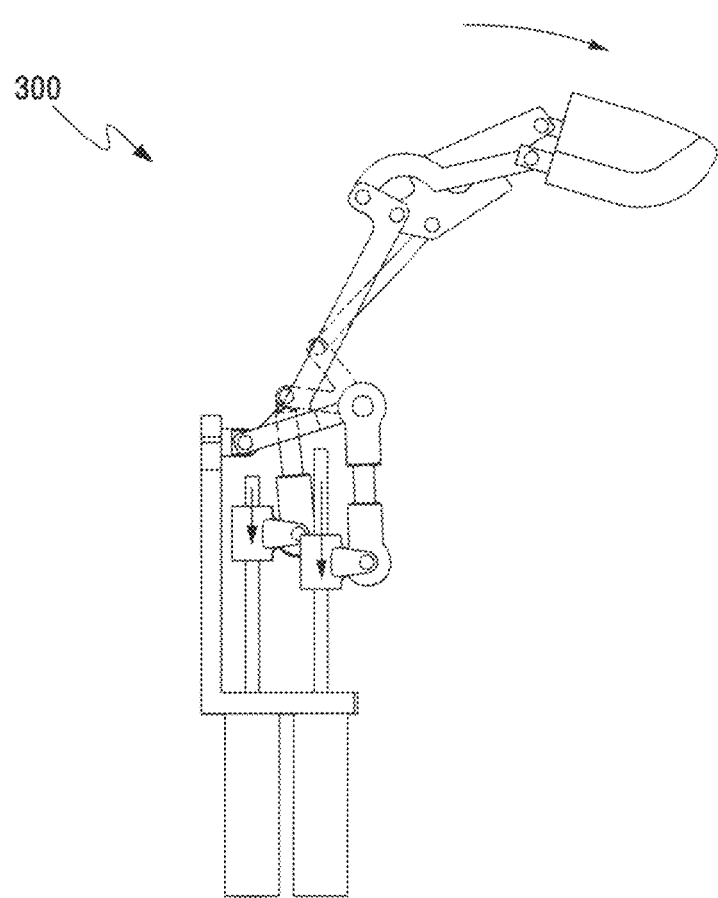
FIG. 14 is a side view illustrating a motion of the finger mechanism of FIG. 12.

Referring to FIGS. 12 to 14, the finger mechanism 300 according to the present example embodiment includes a third knuckle 80 and a third joint 90, in addition to the elements included in the finger mechanism 200 explained above referring to FIGS. 9 to 11.

A first end of the third knuckle 80 is connected to a second end of the second knuckle 50, so that the third knuckle 80 extends from the second knuckle 50. The first knuckle 20 corresponds to the first knuckle of the finger extending from the palm, and the second knuckle 50 corresponds to the second knuckle of the finger extending from the first knuckle, and then the third knuckle 80 corresponds to a third knuckle of the finger which extends from the second knuckle of the finger to be an end of the finger.

The second knuckle of the finger is connected to the third knuckle of the finger by the DIP joint, and the third knuckle does not move independent of the second knuckle due to the DIP joint. Thus, in the finger mechanism 300 according to the present example, any additional driving part is unnecessary to drive the third knuckle.

In addition, when the second knuckle of the finger is rotated with respect to the first knuckle of the finger, the third knuckle of the finger is rotated with interlocked with the second knuckle and the rotational angle of the third knuckle is larger than that of the second knuckle. Thus, in the third joint 90 of the finger mechanism 300 according to the present example, when the second knuckle 50 is rotated with respect to the first knuckle 20, the third knuckle 80 is rotated with interlocked with the second knuckle 50 and the rotational angle of the third knuckle 80 is larger than that of the second knuckle 50.

The finger mechanism 300 according to the present example embodiment is explained in detail referring to FIG. 12.

In the finger mechanism 300 according to the present example embodiment, as illustrated in FIG. 12, an eighth point ⑧ which is a first end of the third knuckle 80 is connected to the second end of the second knuckle 50.

In addition, the third joint 90 includes a link bar. A first end of the link bar is connected to the fifth point ⑤ which is the second end of the first knuckle 20, and a second end of the link bar is connected to a ninth point ⑨ which is a second end of the third knuckle 80.

The fifth point ⑤ which is the second end of the first knuckle 20 is spaced apart from the fourth point ④ which is the second end of the first knuckle 20 along an opposite direction to the rotational direction of the second knuckle 50. The ninth point ⑨ which is the second end of the third knuckle 80 is spaced apart from the eighth point ⑧ which is the first end of the third knuckle 80 along the rotational direction of the second knuckle 50.

Thus, when the second knuckle 50 rotates with respect to the first knuckle, the third knuckle 80 rotates with an angle larger than that of the second knuckle 50, as illustrated in FIG. 13 and FIG. 14, since the ninth point ⑨ is pulled by the link bar 90.

Here, a ratio between a rotational radius of the second knuckle 50 and a rotational radius of the third knuckle 80 may be about 1:1.4 which is similar to the ratio in the finger of the human beings.

In the finger mechanism 300 according to the present example embodiment, two degrees of freedom of MCP joint and one degree of freedom of PIP joint are added to perform three degrees of freedom, and a passive movement of the third knuckle is performed like the finger of the human beings, so that all kinds of movements in the finger of the human beings may be performed.

In addition, the finger mechanism and the robot hand having the finger mechanism have relatively simple structure and have the size similar to that of the hand of human beings, and thus the cost price for manufacturing may be decreased.

In addition, in the finger mechanism and the robot hand, the driving part is disposed inside of a palm instead of being disposed at each knuckle of the finger, and thus additional sensors may be easily equipped and the sensors may be easily integrated. Here, the driving part is performed as the linear actuator driven along the Z axis direction. Thus, the finger mechanism and the robot hand may be easily modularized.

Although the exemplary embodiments of the present invention have been described, it is understood that the present invention should not be limited to these exemplary embodiments but various changes and modifications can be made by one ordinary skilled in the art within the spirit and scope of the present invention as hereinafter claimed.

Further, the finger mechanism according to the exemplary embodiments of the present invention may be applied to an element of a device performing the finger movement such as tongs and so on in addition to the robot hand mentioned above.

What is claimed is:

1. A finger mechanism comprising:
 a base extending along a Z axis direction, a first knuckle, a first driving part configured to control a movement of the first knuckle with respect to the base, and a first joint comprising a frame; and
 a second knuckle, a second driving part configured to control a movement of the second knuckle with respect to the first knuckle, and a second joint comprising a bell crank,
 wherein the first driving part comprises a first actuator and a second actuator,
 wherein a first point is rotatably connected to the base, a second point is connected to the first actuator, a third point is connected to a second actuator in the frame, so that the frame is rotated with respect to the first point as the first driving part is driven,
 wherein a first end of the first knuckle is connected to the frame, so that the first knuckle is rotated around an X axis with respect to the base when the first actuator and the second actuator move the second point and the third point equally, and the first knuckle is rotated around an Y axis with respect to the base when the first actuator and the second actuator move the second point and the third point unequally,
 wherein a fourth point which is a second end of the first knuckle is rotatably connected with a sixth point which is a first end of the second knuckle, and
 wherein a center of the bell crank is rotatably connected with the frame, a first end of the bell crank is connected to the second driving part, a second end of the bell crank is connected to a seventh point which is a first end of the second knuckle and is spaced apart from the sixth point along a rotated direction of the second knuckle.

2. The finger mechanism of claim 1, wherein each of the first actuator and the second actuator is a linear actuator driven along the Z axis direction,
 wherein the first joint further comprises:
  a first link bar connecting the second point with a moving slide of the first actuator; and
  a second link bar connecting the third point with a moving slide of the second actuator, and
 wherein the first link bar is rotatably connected with each of the second point and the moving slide of the first actuator, and the second link bar is rotatably connected with each of the third point and the moving slide of the second actuator.

3. The finger mechanism of claim 2, wherein the first point and the base are connected with each other via a universal joint, and
 wherein a rod end bearing is configured to connect the first link bar with the second point, to connect the first link bar with the moving slide of the first actuator, to connect the second link bar with the third point, and to connect the second link bar with the moving slide of the second actuator.

4. The finger mechanism of claim 1, wherein the first point, the second point and the third point forms an imaginary isosceles triangle, and a line between the second point and the third point forms a base of the imaginary isosceles triangle.

5. The finger mechanism of claim 1, wherein each of the first driving part and the second driving part is disposed at a first side of the Z axis direction with respect to the first joint, and each of the first knuckle and the second knuckle is disposed at a second side of the Z axis direction with respect to the first joint.

6. The finger mechanism of claim 5, wherein the bell crank is disposed at the same side with the first knuckle with respect to the frame, and
 wherein the second joint comprises:
  a third link bar passing through the frame to connect the second driving part with the first end of the bell crank; and
  a fourth link bar connecting the second end of the bell crank with the seventh point.

7. The finger mechanism of claim 1, further comprising:
 a third knuckle, and a third joint configured to control the third knuckle to be interlocked with a movement of the second knuckle with respect to the first knuckle,
 wherein an eighth point which is a first end of the third knuckle is connected to a second end of the second knuckle,
 wherein the third joint comprises a fifth link bar having a first end connected to a fifth point which is a second end of the first knuckle and a second end connected to a ninth point which is a second end of the third knuckle, and wherein the fifth point is spaced from the fourth point along an opposite direction of a rotational direction of the second knuckle, and the ninth point is spaced apart from the eighth point along the rotational direction of the second knuckle.

8. A robot hand comprising at least one finger mechanism, each of the at least one finger mechanism is the finger mechanism of claim 1.

9. The robot hand of claim 8, wherein the base of at least one finger mechanism forms a single palm.

10. The robot hand of claim 9, wherein at least one driving part configured to drive the at least one finger mechanism is disposed inside of the single palm.

\* \* \* \* \*